H. S. GOODKOWITZ.
MEASURING INSTRUMENT.
APPLICATION FILED MAR. 16, 1912.
1,066,007.
Patented July 1, 1913.
2 SHEETS—SHEET 1.
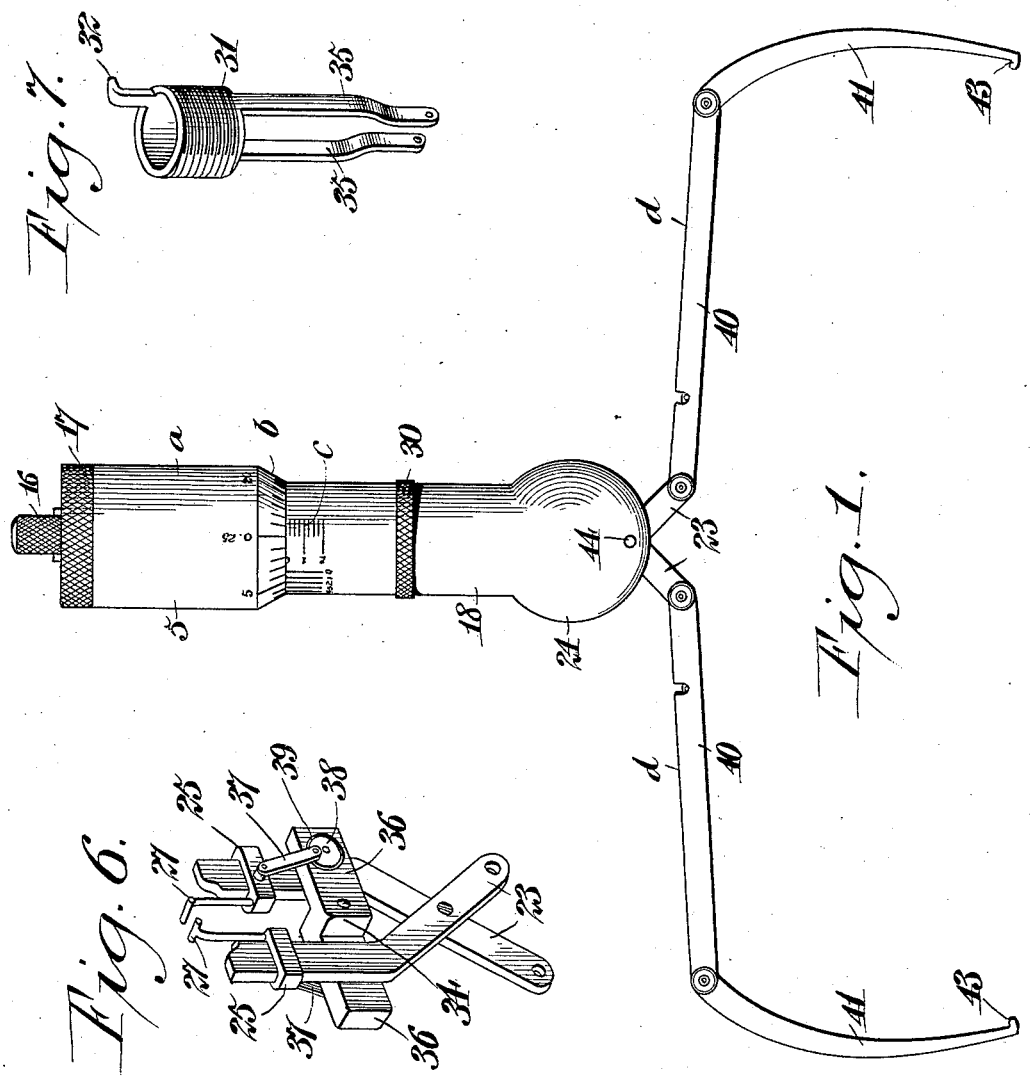
Witnesses:
Chrst Feinle jr.
John A Wandagan
Inventor,
Hyman S. Goodkowitz.
By Victor J. Evans,
Attorney.

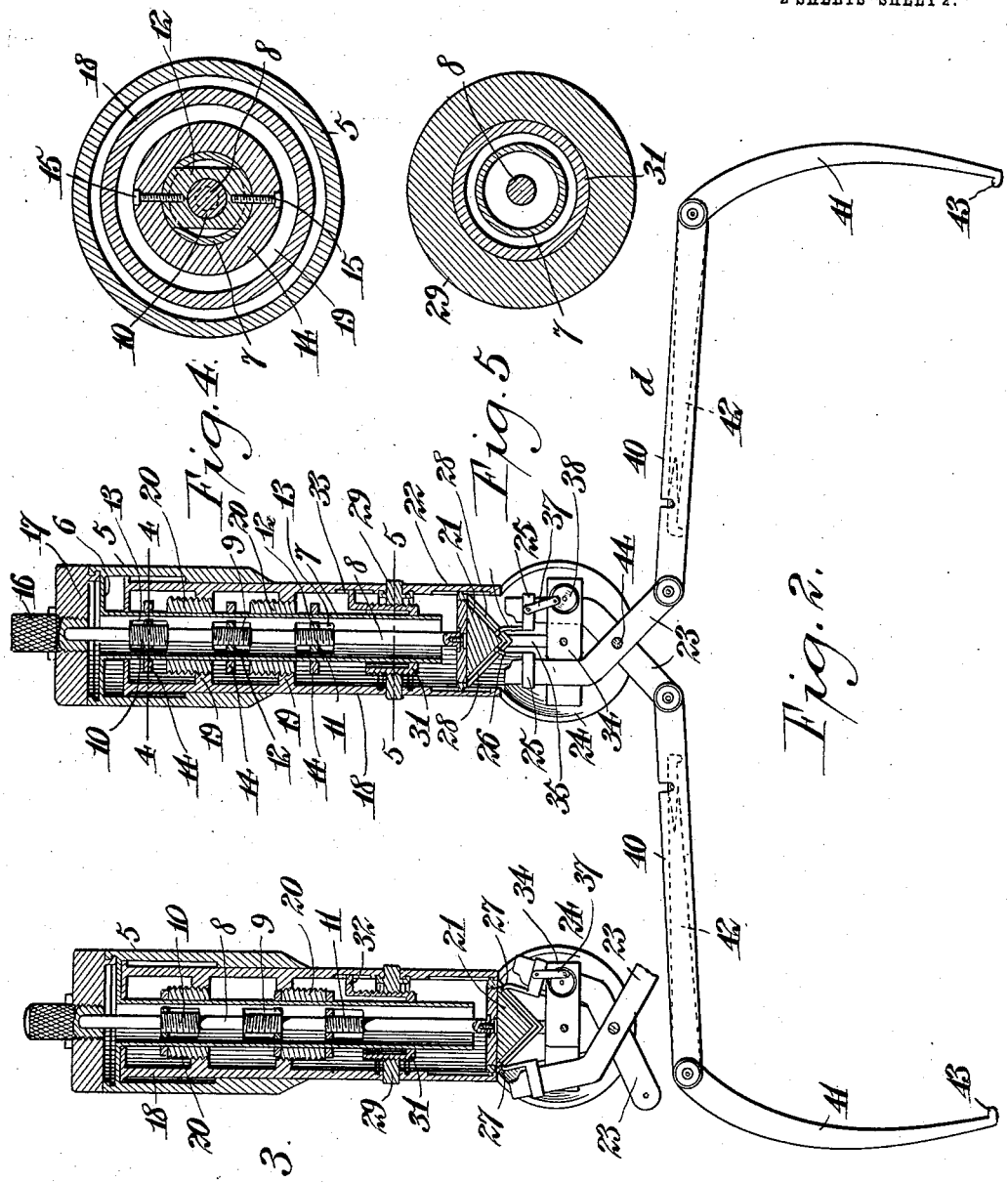

UNITED STATES PATENT OFFICE.

HYMAN S. GOODKOWITZ, OF KINSTON, NORTH CAROLINA.

MEASURING INSTRUMENT.

1,066,007. Specification of Letters Patent. Patented July 1, 1913.

Application filed March 16, 1912. Serial No. 684,132.

*To all whom it may concern:*

Be it known that I, HYMAN S. GOODKOWITZ, a citizen of the United States, residing at Kinston, in the county of Lenoir and State of North Carolina, have invented new and useful Improvements in Measuring Instruments, of which the following is a specification.

The general object of the invention is to simplify, by reducing the number of steps in the operation of measuring lengths or objects with a dividers or calipers. And to this end the invention consists in adapting a dividers or calipers, and a micrometer, one for connection to the other, and further adapting the parts when so connected as to enable the micrometer to adjust the arms of the dividers or calipers, and to indicate by its scale and vernier, the intervening distance between the points of the said arms.

Other objects will appear and be better understood from that embodiment of my invention of which the following is a specification, reference being had to the accompanying drawings forming part hereof, in which;

Figure 1 is a side elevation of the device. Fig. 2 is a view similar to Fig. 1 but with the micrometer in vertical section. Fig. 3 is a detail vertical section of the micrometer also showing fragments of the caliper arms which are spread or in open position. Fig. 4 is a detail horizontal section taken approximately on the line 4—4 of Fig. 2. Fig. 5 is a view similar to Fig. 4 on the line 5—5 of Fig. 2. Fig. 6 is a detail perspective of the connected end portions of the measuring arms. Fig. 7 is a detail perspective of one element of the means for varying the spread of the arms.

The micrometer is designated generally by $a$, its vernier by $b$, and scale by $c$ and the measuring arms of the calipers or dividers, as the case may be, by $d$.

The barrel 5 of the micrometer has at one end a head 6, which is formed integral or otherwise suitably connected to the barrel, and suitably connected to the head is a tube 7 which opens at one end through the head and which forms a casing for the micrometer screw 8. This screw 8 has an intermediate threaded portion 9 which lies between and is spaced from threaded portions 10 and 11 whose threads extend in the same direction and reversely to the thread of the portion 9.

The threaded portions 9, 10 and 11 are of different diameters and are screwed into blocks 12—12 whose ends aline with oppositely disposed oblong openings 13 corresponding in number and arrangement to the threaded portions 9, 10 and 11 and formed in the tube 7. The clutch or clamp rings 14—14 pass loosely over the tube 7 and are fixedly secured to the blocks 12 by suitable means such as screws 15, all of which is shown in Fig. 4. The screw 8 is made fast at one end to a plug 16 which is threaded into or otherwise adjustably secured to a milled head or nut 17 swiveled in the barrel 5 above the head 6. With the construction thus far described, it will be observed that when the barrel 5 is turned and the element 17 held, the barrel will simply have a rotary but not a combined rotary and longitudinal movement.

The upper section of the sleeve 18 is nicely fitted in the barrel 5 and carries interiorly threaded collars 19—19 spaced suitable distances apart and which receive the screw threaded plugs or nuts 20—20, which loosely receive the tube 7.

Since the nuts are disposed between the clamp or clutch collars 14 and since these elements are locked with the tube, it will be evident that when the element 17 is turned the adjacent collars 14 will move relatively to each other. Now if the direction in which the element 17 is turned is such as to cause adjacent collars to move relatively toward each other, it will be seen that if the collars are positioned at the beginning of this turning movement as shown in Fig. 2, the said adjacent collars will eventually contact with the opposite ends of one of the nuts 20, such as that shown in Fig. 3. When the parts are so positioned the tube and the lower of said nuts as viewed in Figs. 3 and 4, will be interlocked so that the barrel 5 will be caused to move longitudinally when it is turned in the ordinary manner.

In passing it may be stated that the thread of the upper nut in Figs. 3 and 4, is pitched differently from the thread of the lower nut in each of the said figures so that when one of the nuts is interlocked with the barrel as shown in Fig. 3, the said barrel when given one revolution, will move longitudinally for a distance different from that which it will move when interlocked with the other nut and given but one revolution. This construction admits of obtaining measurements in different fractions of an inch, such as sixty-fourths and fortieths.

The lower end of the screw 8 is swiveled to an inverted conical-shaped member 21 which is slidingly fitted but held against rotary movement, in the lower section 22 of the sleeve. The element 21 is connected to the measuring arms *d* whose inner sections 23—23 cross each other and are pivoted between spaced circular ears 24—24 depending from the section 22. The instrumentalities for effecting the connection between the measuring arms and member 21, consist of collars 25—25 which are slidingly fitted on the upper portions of the sections 23—23 and arms 26—26 which project upwardly as viewed in Fig. 4, from the adjacent ends of the collars and rollers 27—27 Fig. 6 which fit into guides 28—28 on opposite portions of the cone 21.

As viewed in Fig. 2, the sections 23—23 are in the positions they will occupy when the measuring arms are collapsed; that is to say, when the lower sections of these arms are straightened or substantially so. In this position it will be seen that the rolls 27 are adjacent to the point of the cone 21, but as viewed in Fig. 3 the sections 23—23 are shown in the positions they will occupy when spread apart, the said rolls being at the upper ends of the guides 28. It will, of course, be understood that this adjustment of the sections 23—23 as shown in Fig. 3, has been brought about by the shape of the cone 21 and the downward movement thereof caused by turning the micrometer screw in one direction by the barrel 5 when the parts as before stated, are interlocked. The sections 18 and 22 of the barrel are connected by a coupling ring 29 which is swiveled or rotatably mounted in the said sections and has a milled portion as indicated by 30 in Fig. 1, by which it may be turned. This coupling ring is screwed onto an adjusting sleeve 31 which is held against turning by means of a finger 32, which enters a groove 33 in the section 18 of the sleeve. The endwise movement imparted to the sleeve 31 by turning the coupling ring 29, moves a block 34 which is connected to the arms 35—35 depending from opposite portions of the sleeve 31. The block 34 Fig. 6 is arranged between the sections 23—23 of the arms and has offset portions 36—36 which extend in opposite directions and transversely of opposite faces of the arms to which they are connected by means of links 37—37 which are connected to the collars 25—25 and to sheaves 38, one of which is shown in Figs. 2, 3 and 6, arranged in circular guides 39 in the offset portions 36.

The sections 40—40 of the arms *d* are detachably and pivotally connected to the sections 23—23 and also detachably and pivotally connected to the sections 41—41 and similarly connected to sections 42—42 shown by dotted lines in Fig. 2. In Fig. 2 the sections 40 and 41 are shown adjusted for calipering relatively large objects. It will, of course, be understood that normally the sections 40 will extend coextensive with the micrometer and the sections 41 will extend substantially coextensive with the sections 40.

Remembering now that the threads of the nuts 20 are of different pitch, it may be stated that the length of the measuring arms *d* shown in the drawings, is such that when the clamping rings are locked with the nut having the thread of greater pitch, one revolution of the barrel 5 will cause the end portions 43—43 to separate for a distance which will be recorded by the micrometer scale and any fraction of this distance will be measured with the vernier. When it is necessary to use measuring arms of a certain greater length than those shown, the sections 40 with the parts connected thereto, are detached from the sections 23 and longer measuring arms are then connected thereto. It will now be manifest that on account of the immovability of the fulcrum or pivot 44, it will be impossible for the tips of the inturned end portions of the longer sections to bear one upon the other when the said sections extend coextensive with the micrometer as before described, for the arms shown unless the inner end portions of the sections 23 are slightly spread. This spreading of the said sections is effected by turning the milled portion 30 of the coupler 29 in such direction as to move the block 34 with the parts connected thereto upwardly, and until the tips of the inturned portions bear one upon the other. Since the measuring arms are now of greater length, it is evident that the elements 25 are nearer the free ends of the portions 23, hence when the cone descends as shown in Fig. 3 the free ends of the portions 23 will be spread for a less distance than shown in Fig. 3. Therefore this arrangement for adjusting the elements 25 admits of maintaining the same ratio between the measuring arms *d* and the portions of the arms 23 inwardly of the pivot 44 and gives the same result as a shiftable fulcrum.

Although I have shown and described one embodiment of my invention it is to be understood that I am not to be limited to the specific arrangement and construction of parts since various changes may be made, within the scope of the appended claims without departing from the spirit or sacrificing any of the advantages of the invention.

What I claim as new is:

1. In a measuring instrument, the combination of a micrometer including a sleeve having a tube therein, a screw extending longitudinally of said screw and having differentially threaded portions, nuts engaging said sleeve exteriorly thereof, means engaging the threaded portions on said screw for interlocking said nuts with the barrel of said micrometer, and with a pair of pivotally connected arms connected to said screw and movable thereby.

2. In a measuring instrument, the combination of a pair of pivotally connected arms, a micrometer including a sleeve having a tube therein, a screw extending longitudinally of said tube, and means engaging said sleeve and said screw whereby the screw is given a longitudinal movement with respect to the sleeve in the rotation of the tube.

3. In a measuring instrument, the combination of a pair of pivotally connected arms, a micrometer including a sleeve having a tube therein, a screw extending longitudinally through said tube, clamping means locked to said tube and engaging said screw, and nuts interposed between said clamping means and engaging said sleeve whereby said screw will be given a longitudinal movement with respect to the sleeve in the rotation of the tube.

In testimony whereof I affix my signature in presence of two witnesses.

HYMAN S. GOODKOWITZ.

Witnesses:
 A. L. PEARSEN,
 A. GROSS.

Copies of this patent may be obtained for five cents each, by addressing the "Commissioner of Patents, Washington, D. C."